Jan. 8, 1957 | W. E. GARITY | 2,776,594

METHOD OF AND MEANS FOR PRODUCING STEREOSCOPIC ANIMATED CARTOONS

Filed Aug. 18, 1953 | 2 Sheets-Sheet 1

INVENTOR.
WILLIAM E. GARITY,
BY
C. Q. Wiedette
ATTORNEY.

Jan. 8, 1957 W. E. GARITY 2,776,594

METHOD OF AND MEANS FOR PRODUCING STEREOSCOPIC ANIMATED CARTOONS

Filed Aug. 18, 1953 2 Sheets-Sheet 2

INVENTOR.
WILLIAM E. GARITY,
BY
[signature]
ATTORNEY.

United States Patent Office 2,776,594

Patented Jan. 8, 1957

2,776,594

METHOD OF AND MEANS FOR PRODUCING STEREOSCOPIC ANIMATED CARTOONS

William E. Garity, Los Angeles, Calif., assignor to Walter Lantz Productions, Inc., Los Angeles, Calif., a corporation of California Application August 18, 1953, Serial No. 375,028

6 Claims. (Cl. 88—16)

This invention relates to methods of preparing cells, bearing representations of objects at different distances from an observer, for the production of animated cartoon films for stereoscopic projection. The invention relates to methods and means for facilitating the production of animated cartoons and the like in three dimensional form, whereby realistic, controllable, stereoscopic effects can be obtained, without the necessity of imposing a heavy burden upon the artists making such cells.

Animated cartoon motion picture film, for the usual flat projection, which has been had heretofore, has been made by painting objects upon transparent cells, certain cells depicting foreground objects, others depicting middleground objects, while still other cells may depict a background or parts thereof. Certain cells may depict only the moving portion of an object, another complementary cell bearing the relatively stationary portion of the object. The artists or animators entrusted with the making of these cells, so proportion the sizes of the representations that when an assemblage of cells is placed in superimposed relation, a complete picture having desired perspective is visible to the observer or camera. Each cell is provided with registry holes which hold the cells in proper alignment and insure that inserted or substituted cells assume a desired position with respect to the others. These cells are held by pins projecting through the registry holes both during painting or animation, and during photography. Stop-motion photography is used to obtain a single strip of film whose successive frame areas bear images of cell assemblies in sequence suitable to depict the action upon projection of the film. During photography, the cells may be in substantial contact with one another (in sandwich form), or they may be spaced from one another. Many prior patents are directed to such systems, among them being: 1,380,298, 1,760,156, 1,869,904, 2,198,006, 2,201,689, 2,254,462, and 2,260,092. These prior methods are incapable of producing stereoscopic motion pictures. As here employed, the term stereoscopic refers to motion picture methods which utilize left-eye and right-eye images, either projected simultaneously upon the screen, or in very rapid succession, the left and right images being projected through suitable analysers so that the audience may observe the projected images through similar analysers, the left eye of an object being only cognizant of the left-eye images. Such stereoscopic systems permit an observer to see objects in accurate, spatial displacement, and some objects may appear to be in front of the plane of the screen, others may lie in the plane of the screen, while still others may appear to be beyond the plane of the screen.

The present invention is directed to methods and means whereby stereoscopic cartoon films may be readily produced. Generally stated, the method of the present invention contemplates the preparation of a plurality of cells in the normal manner, arranged for normal composite super imposition when arranged about a centrally disposed registration center, which is customary. In accordance with the present invention, right and left eye registration indicia are established on each cell, these indicia being spaced from each other and preferably from the normal vertical center line or center registration pin common to all cells. During the establishment of such right and left eye registration indicia, the spacing between said registration indicia is regulated and controlled in accordance with the distance from the observer which the object of representations depicted on the cell is to assume upon projection. A composite picture is then formed by placing an assemblage of cells together with the left-eye index in alignment and photographing such assemblage. Cells are then substituted, added or removed, and step-by-step photography is performed until all of the action as it would be visible to the left eye has been photographed. The entire sequence of action is then again photographed on a separate strip of film, but during this sequence of step-by-step photography, the cells are aligned about the right-eye index carried by the cells. In this manner a strip of film bearing right-eye images is obtained. The two strips of film can then be simultaneously projected, using two interlocked projectors and suitable analysers, desired objects assuming true superimposition upon the screen or in space, permitting the audience, provided with suitable analysers such as polarizing spectacles to view the projected film in stereoscopic relief.

It is an object, therefore, to disclose and provide means and methods for facilitating the production of animated cartoons in stereoscopic form. It is also an object of the invention to disclose and provide means and methods whereby cells may be controllably positioned with respect to each other so as to insure the production of left eye and right eye images during photography.

These and various other objects and advantages of the present invention will become apparent to those skilled in the art from the following description of certain illustrative examples. In order to facilitate understanding, reference will be had to the appended drawings in which.

During animation and during photography, peg boards are used, and the average camera uses both a top and bottom peg bar, occasionally a third or a fourth peg bar is employed, but mechanical difficulties ordinarily preclude the use of such additional peg bars. The ordinary cell, such as the cell 10 is provided with a central perforation 12 capable of receiving a round registration pin, and with two horizontally elongated registration holes 13 and 14 capable of receiving similarly shaped registration pins. Such a cell can therefore be mounted upon a peg bar provided with pins capable of extending through these registration holes and accurately position the cell with respect to the center line of the camera which normally passes through a vertical plane extending through the center pin 12. All of the cells such as 10 and 11 bear identical registration holes so that the various representations of objects borne by these various cells make a composite picture when the cells are arranged upon the registration pins.

Figure 1:
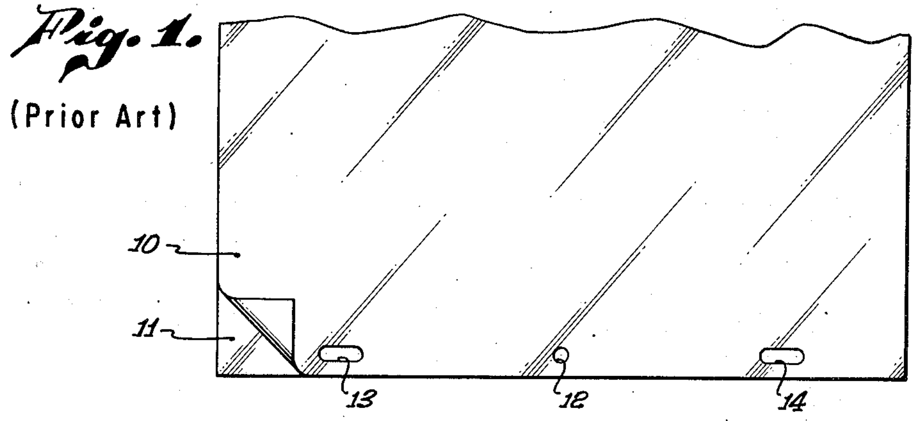
Fig. 1. (Prior Art)
Fig. 1 is a plan view of a normal assemblage of cells used in the production of animated cartoons.
Figure 2:
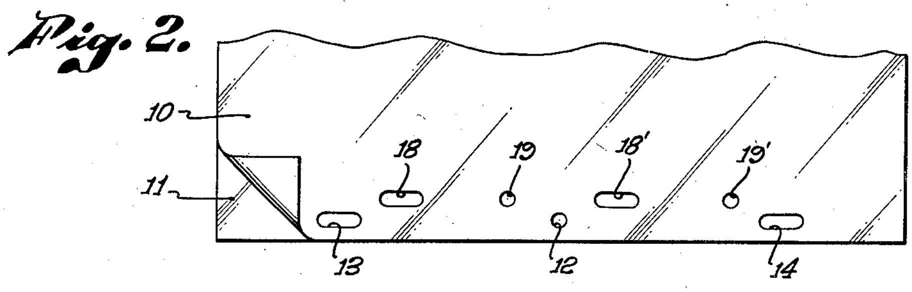
Fig. 2 is a portion of a cell provided with right and left eye registration indicia.

As previously indicated, each of the cells is now provided with right and left-eye registration indicia. Fig. 2 illustrates a portion of a cell in which the elongated holes 18 and 18′ represent a left-eye index, whereas the round holes 19 and 19′ represent a right-eye index. It will be noted that these indexing perforations have been made in spaced relation to the central aperture 12 and are shown in a central, on-screen image position. Original registration holes 13 and 14 need not be elongated if indexing perforations 18 and 19 are not in alignment with holes 13 and 14.

Figure 3:
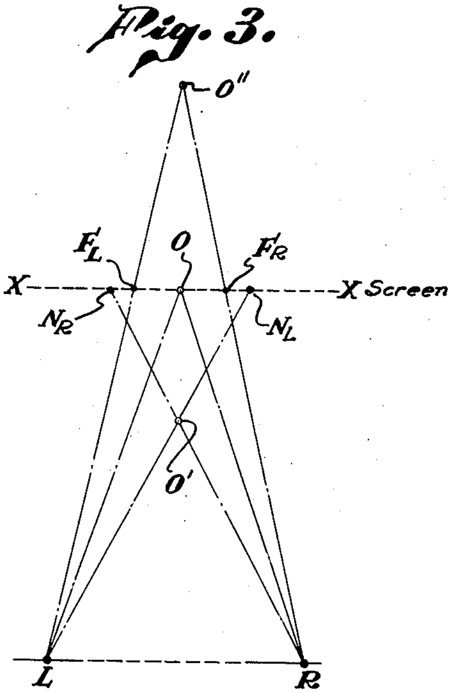
Fig. 3 is a schematic representation illustrating optical principles involved.

As we now refer to Fig. 3, the positioning of an object in space by stereoscopic means will become apparent. The points L and R at the bottom of the diagram may be said to represent left and right points of view. The plane X—X may represent the plane of a projection screen and O may represent an object lying in such screen plane. In the event it is desired to depict an object O′ in front of the screen plane, it will be noticed that the line of sight passing through such object from the left eye would intersect the screen at a point $N_L$ whereas the line of sight from the right eye would pass through the object and intersect the screen plane at $N_R$. The distance O—$M_L$ may be said to represent the distance which would be necessary to displace a cell bearing a pictorial representation of object O′ in order to cause said object to appear nearer the observer and in front of the plane of the screen.

If it is desired to depict an object behind the plane of the screen, such as for example, the object O″, then it will be noted that the line of sight directed from the left eye to the object would pass through the screen plane at a point $F_L$, and at the distance $F_L$—O represents the displacement and the direction of displacement which must be imparted to a cell in order to permit the object to be viewed stereoscopically in a distant spatial relationship with respect to the screen.

Figure 4:
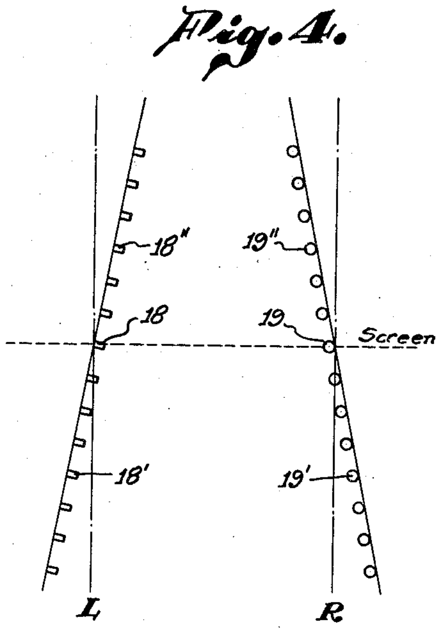
Fig. 4 is a diagram illustrating the numerous positions in which an object carried by a cell may be caused to assume.

Fig. 4 illustrates graphically, the relative positioning of the left and right-eye registration indicia in order to position objects carried by cells provided with such indicia either in front of the screen or in back of the screen. It will be noted, moreover, that in the event left optic index 18 is moved from its normal position at 18 to the position indicated at 18″, it is necessary that the right-eye index 19 be moved from its normal "on screen" position to position 19″, the extent or magnitude of such displacement being equal for both indicia, in order that the image assume an in-front-of-screen or "near" position.

Figure 5:
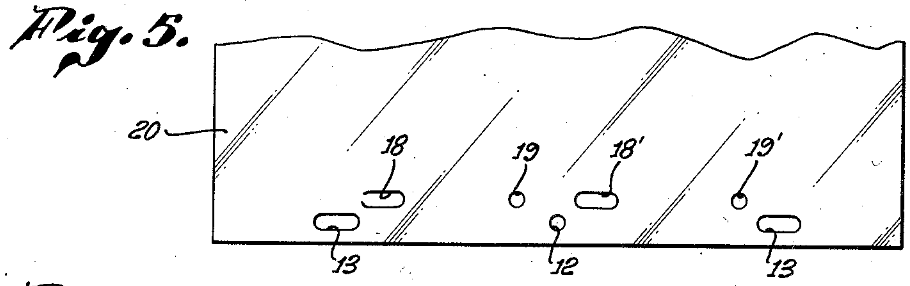
Fig. 5 is a portion of a cell provided with left and right eye indicia corresponding to an object to be located in front of the plane of a screen.

Fig. 5 illustrates a cell which has been punched with left and right-eye registration holes 18 and 19 for the purpose of placing the pictorial representation carried by such cell in position in front of a screen. It will be noted that Fig. 5 in comparison with Fig. 2 shows that both of the indicia 18 and 18′ have been moved to the left and index holes 19 and 19′ have been moved to the right of their normal positions, the amount of movement being opposite, equal and correlated to the distance from the screen that the image is to assume.

It is a general rule, therefore, that the spacing between the left and right indicia 18 and 19 is reduced from normal with increase in distance of the object from the observer, and the spacing between such indicia is increased with decrease in the distance of the depicted object from the observer.

Any suitable punch may be employed in forming the left and right registration indicia upon the cells. Preferably, such punch includes elements capable of cooperating with the central registration hole 12, and also with portions of the normal registration holes 13 and 14. The punching elements which form the indicia 18 and 19 are preferably mounted upon nuts carried by a shaft provided with right and left hand threads so that the two punches (forming 18 and 19 and 18′ and 19′) may be simultaneously adjusted toward or away from each other. Calibrating means are provided whereby the precise amount of movement given to the punching elements and the location of the registration indicia thus formed can be carefully and accurately established in accordance with the results desired.

Figure 6:
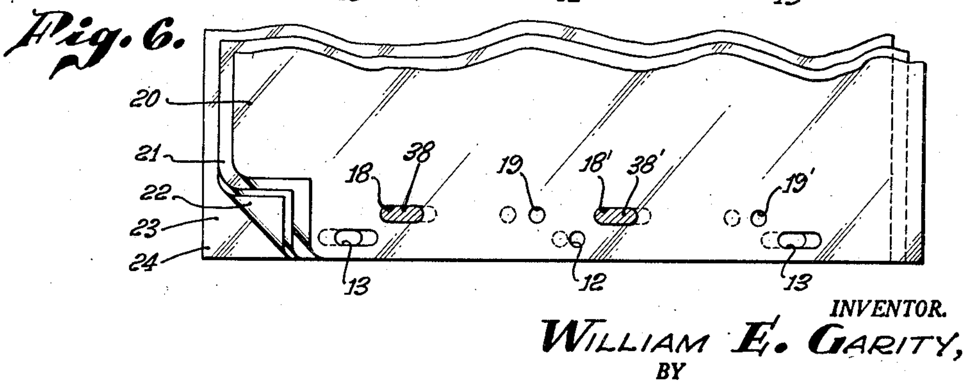
Fig. 6 illustrates an assemblage of cells in position for photographing the left-eye view.
Figure 7:
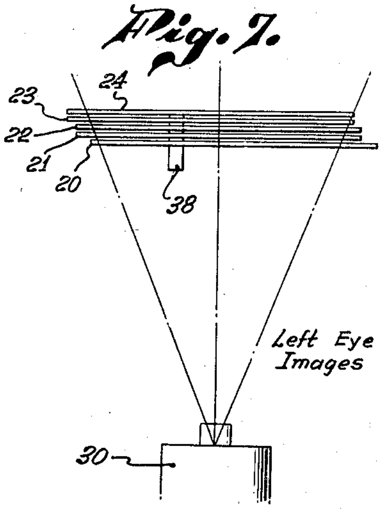
Fig. 7 is a diagrammatic representation showing a characteristic arrangement of cells during photography of left-eye images.

After all of the cells have been provided with the new right and left-eye registration ports, groups of these cells are photographed, each group representing a scene to be depicted on the motion picture film. Figs. 6 and 7 illustrate a typical arrangement of cells whereby a strip of film bearing left-eye images may be obtained. A cell 20 bearing a representation of an object which it is desired to depict in front of the screen is placed in front of cells 21 and 22 which depict an object in the plane of the screen whereas cells 23 and 24 depict objects in the background and beyond the plane of the screen. This assemblage of cells 20–24, is placed within the field of view of a camera 30. The camera is stationary, and its optical axis is directed to intersect the vertical center line of normal cells in normal photography. The peg bar upon which these cells are mounted for the formation of left-eye images is provided with pegs 38 and 38′ adapted to register with the left-eye registration indicia 18, 18′, and the like, so that the entire assemblage of cells is in registry around the left-eye registration index. Additional pegs fit into the elongated slots 13 and 14. These assemblages are then photographed by stop-motion photography so as to produce a strip of film bearing left-eye image impressions in proper sequence.

It will be noted from Figs. 6 and 7 that the various cells are shifted or displaced from the positions which they would normally assume in flat photography, and from the positions in which the cells occupied when the artists originally painted them, the extent and direction of the shift being in accordance with a predetermined schedule such as is indicated in Fig. 4, and in accordance with the desired spatial position with respect to a projection screen of the objects depicted on the cells.

Figure 8:
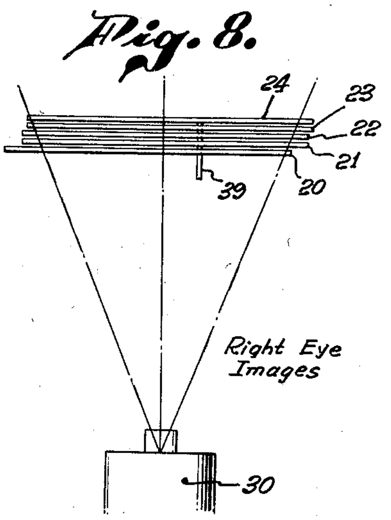
Fig. 8 represents the position which may be assumed by the cells in photographing right-eye images.

Fig. 8 illustrates the procedure which is carried out to produce a strip of film bearing only the right-eye images. After a complete strip has been made bearing left-eye images, the cells are again rephotographed upon another strip of film, but during this stop-motion photography, the cells are registered upon a peg 39 which passes through all of the right-eye registration perforations, such as 19, 19′ and the like. As a result, the cells are shifted with respect to each other in an opposite but equal direction so as to produce a true stereoscopic right-eye image, each photographed image forming a stereoscopic pair with a corresponding, previously photographed left-eye image.

The two strips of film thus obtained are suitably developed and printed, and are ready for projection by the use of a pair of geared, interlocked projectors, preferably with their axes intersecting at the projection screen surface, the left and right films being projected through polarizing filters arranged at 90° to each other. The audience can then view the projected images as a stereoscopic motion picture, members of the audience being provided with spectacles having left and right lenses consisting of polarizing elements with their axes at 90°. It may be noted that the method of the present invention does not require the shifting of the photographic camera, the peg bar remaining stationary with respect to the camera axis. Peg 38 is used when left-eye images are photographed, then removed and peg 39 used during the photography of cell assemblies representing right-eye images. It may also be noted that cells depicting objects which are to be visable in the plane of the screen do not shift horizontally.

The method of the present invention does not impose any new or unusual burden upon the artists who make up the cells, proper right and left-eye images being obtained by the establishment of the set of right and left-eye registration ports. Those skilled in the art will appreciate that the new registration ports need not be made in horizontal alignment with the horizontal registration holes 12, 13 and 14, but instead could be made along the opposite edge of a cell or on any other available area of the cell. When panning shots are used with field of view moving vertically, the left and right optic registration indexes may be placed along the vertical margin areas of the cells.

Although it is desirable that the left and right-eye registration indicia be readily distinguishable as to form, the invention is not limited to the specific form illustrated.

All changes and modifications coming within the scope of the appended claims are embraced thereby.

I claim:

1. A method of facilitating the production of animated cartoons and the like in stereoscopic form, comprising: preparing a plurality of cells in a normal manner arranged for normal, composite superimposition when arranged about a centrally disposed registration center, certain cells depicting a representation of a foreground object, and others depicting a representation of middleground and background objects; punching a set of right and left-eye registration ports in each of said cells, regulating the spacing between registration ports in each cell in accordance with the desired spatial position with respect to a projection screen upon which a composite of such cells is to be projected, the spacing between said registration ports being further apart on cells bearing representations of foreground objects than the spacing between registration ports on cells bearing middleground and background objects; photographing assemblages of cells with one of said registration ports in alignment to obtain a series of left-eye images in sequence upon a strip of film, and then photographing the same assemblages of cells with the other registration ports in alignment to obtain a series of right-eye images in sequence upon a strip of film.

2. In a method of handling cells for producing animated cartoon films for stereoscopic projection, the steps of: establishing a set of right and a set of left-eye registration ports in each cell, the right eye registration ports differing in contour from the left eye registration ports; photographing assemblages of cells with one set of said registration ports in alignment to obtain a film bearing a series of left-eye images, and rephotographing said assemblages of cells with the other set of registration ports in alignment to obtain a film bearing a series of right-eye images.

3. A method of the character stated in claim 2 wherein the spacing between the right eye and left eye registration ports on each cell is varied in accordance with the desired spatial position which the object depicted on a cell is to occupy upon the subsequent, simultaneous projection of a film strip.

4. In the preparation of a plurality of cells, each bearing representations of objects at different distances from an observer, for the production of animated cartoon films for stereoscopic projection, the steps of: forming right and left eye registration indicia on each cell in spaced relation to a vertical centerline common to all cells, the right eye registration indicia differing in contour from left eye registration indicia; and varying the location of the registration indicia so formed on the cells with respect to said common centerline in accordance with the distance which the object depicted on a cell is desired to assume from the observer upon projection by reducing the spacing between said indicia with reduction in distance of the object from the observer.

5. A cell for use in the production of animated cartoon films adapted for stereoscopic projection, comprising: a sheet of transparent material carrying a representation of an object; a pair of registry means formed in the cell, said registry means being horizontally spaced from each other and equally spaced from the vertical median of such cell, the contour of one of said registry means differing from the contour of the other, the spacing between said registry means denoting the spatial position of the object representation carried by the cell.

6. An assemblage of cells for use in the production of animated cartoon film adapted for stereoscopic projection comprising: a plurality of cells, each comprising a sheet of transparent material carrying a representation of an object; a pair of registry means formed in each cell, said registry means being of different contour and spaced from each other, the spacing between registry means formed in certain of said cells differing from the spacing of registry means formed in other cells of said assemblage, the spacing between each pair of registry means denoting the spatial position of the object representation carried by the cell, and a peg bar for receiving and holding an assemblage of said cells, said peg bar being provided with a peg having a contour adapted to cooperate with and receive only one of said registry means.

References Cited in the file of this patent

UNITED STATES PATENTS

| | | |
|---|---|---|
| 1,868,993 | Rufle | July 26, 1932 |
| 2,057,051 | Owens | Oct. 13, 1936 |
| 2,522,662 | Brier et al. | Sept. 19, 1950 |
| 2,560,658 | Pareto | July 17, 1951 |
| 2,587,585 | Ayres | Mar. 4, 1952 |

OTHER REFERENCES

Rood, O. N.: "Method of Producing Stereographs by Hand," pages 71–74 in American Journal of Science and Art, vol. 31, 2nd series, 1861.